April 27, 1954
J. A. WOOD
2,676,592
EYE GUARD AND GUIDE FOR EYE DROPPERS
Filed May 27, 1953
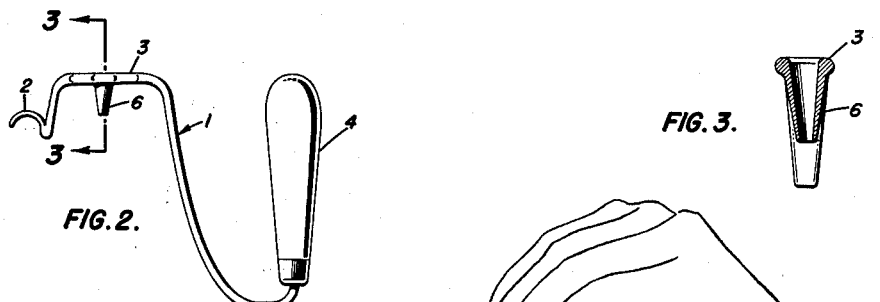
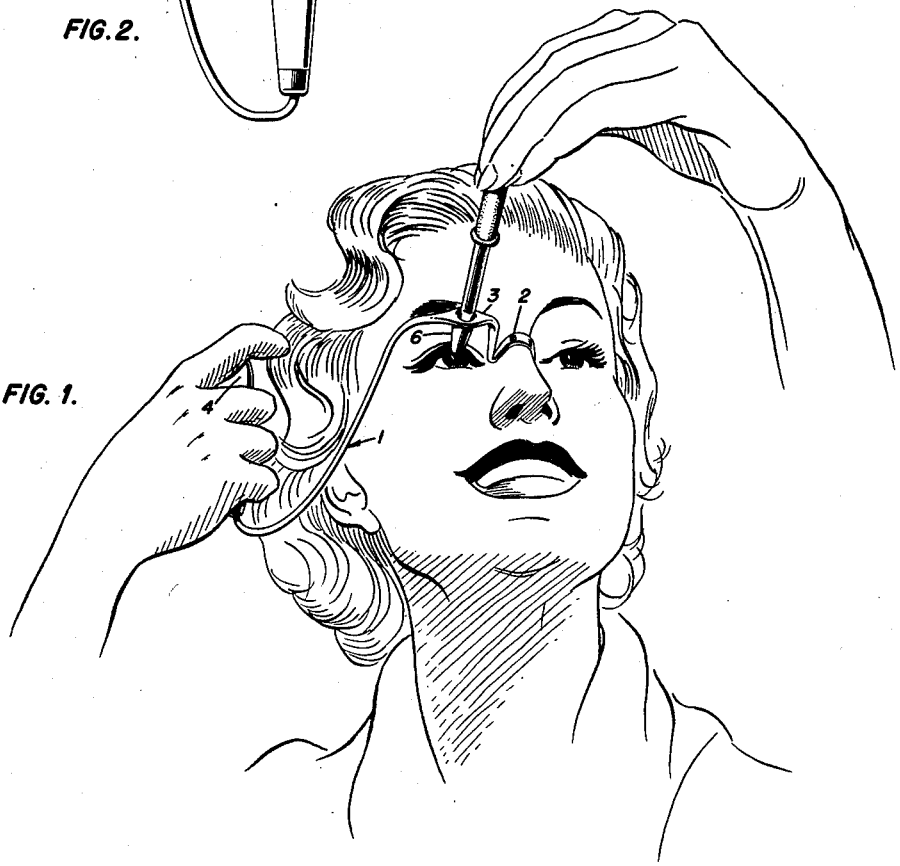
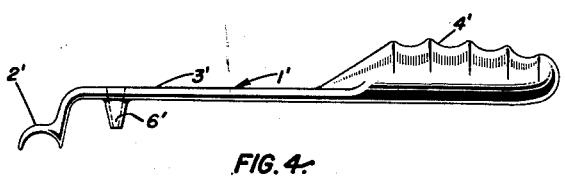
INVENTOR
Joseph A. Wood
BY
ATTORNEYS Patented Apr. 27, 1954

2,676,592

UNITED STATES PATENT OFFICE 2,676,592

EYE GUARD AND GUIDE FOR EYE DROPPERS

Joseph A. Wood, Philadelphia, Pa.

Application May 27, 1953, Serial No. 357,841

5 Claims. (Cl. 128—233)

This invention relates to an eye guard and guide for eye droppers to be used in the self-administration of drops to one's eyes.

At the present time, it is necessary when dropping medicine into one's own eyes, to hold the head back and drop the medicines into the eyes from a dropper supported solely by the hand. Such a means of self-administering drops to one's eyes has the disadvantage that it is difficult to hold the hand steady enough to always drop the medicine at just the right place, and frequently the hand may move sufficiently, as the bulb of the dropper is being squeezed, to cause the lower end of the dropper to move from a position over the eye, so that when the drop of medicine drops from the lower end of the dropper it drops onto the face adjacent the eye instead of into the eye where it is needed.

The present method of self-administering drops into one's own eyes has a further disadvantage that when one is looking directly upward at the end of the dropper, the distance of the lower end of the dropper from the eye cannot be gauged, and there is danger of the lower end of the eye dropper hitting the eyeball, with possible damage thereto.

The present invention contemplates a guide and guard for eye droppers which will enable the lower end of the eye dropper to be supported at a proper position over the eye as well as at a predetermined distance above the eye.

More specifically, the present invention contemplates a guide and guard for eye droppers to be held in one's hand and which has a portion to rest upon the bridge of one's nose, and a portion extending therefrom to be positioned over the eye to be treated which carries means for supporting an eye dropper with the lower end at a predetermined position above the eye. Such supporting means for the eye dropper preferably comprises a short frusto-conical tube into which the lower end of the eye dropper is inserted.

The invention will be further described in connection with the accompanying drawings, but it is to be understood that such further description and illustration is by way of exemplification and the invention is not limited thereby, except to the extent set forth in the appended claims.

In the drawings:

Fig. 1 is a view showing the manner in which the guide and guard of the present invention is used in administering drops to one's own eyes;

Fig. 2 is a side elevation of the guide and guard shown in Fig. 1;

Fig. 3 is a cross-sectional view on line 3—3 of Fig. 2; and

Fig. 4 is a view similar to Fig. 2 of a slightly modified form of the guide and guard.

Referring now to the drawings, the guide and guard of the present invention comprises a member 1 which preferably is made of plastic material, but which may be made of metal or any other suitable material. The member 1 may be of rod-like form, or it may be made of flat stock. It may be molded in one piece or otherwise formed.

One end of the member 1 is shaped into the form of a saddle or bridge 2 which, in use of the guide and guard, is adapted to rest on the bridge of one's nose. The saddle or bridge portion may be flattened or otherwise shaped to make it rest more securely and more comfortably on one's nose. From one side of the saddle or bridge 2, the member is bent and extends upwardly and then transversely to form a portion 3 which is adapted to be positioned above the eye. Beyond the portion 3 the member 1 extends downwardly and is then curved upwardly to form a handle 4 which one grasps to hold the guide and guard in proper position with the saddle or bridge 2 on the bridge of the nose and with the portion 3 above the eye.

The portion 3 has means for receiving the lower end of an eye dropper and thereby support the eye dropper with the lower end a predetermined distance above the eye. While the supporting means for the eye dropper may merely be an opening through the portion 3 of a size sufficient to receive the small lower end of an eye dropper, but not sufficiently large to permit entry of the main portion of the tube of the eye dropper, I prefer to make such means in the form of a frusto-conical tube 6 of a size to receive the lower portion of an eye dropper, since such a tube section will support the eye dropper against wobbling and better enable the lower end of the eye dropper to be maintained at the proper position over the eye. The tube section 6 may extend through the middle of the portion 3, sectionwise, or may extend from one side thereof. The frusto-conical tube section is formed integrally with the section 3, but if desired may be made as a separate piece and secured to the section 3 in any manner.

The horizontal distance from the axis of the tube section 6 to the center of the saddle or bridge portion 2 is approximately one-half the average inter-pupilar distance, so that when the guide and guard is supported on the bridge of one's nose, and an eye dropper inserted in the tube 6, the lower end of the eye dropper will be positioned approximately above the center of the eye.

It will be understood that the guide and guard of the invention may be used for administering drops to either eye, it being necessary only to turn it around so that the handle 4 is at the other side.

The guide and guard shown in Fig. 4 is substantially the same as that shown in Fig. 2, except that the handle 4' extends horizontally instead of vertically as in Fig. 2, and except for the manner in which the portion 3' extends from the saddle or bridge 2'. In this form of the invention, instead of the member 1' extending downwardly at one side of the saddle or bridge and then being bent upwardly from the bottom of that side, the saddle or bridge is merely formed at the end of the portion of the member 1' which extends downwardly from the adjacent side of the portion 3'. The frusto-conical tube 6' for supporting the discharge end of the eye dropper over the eye ball of a person is the same as that shown in the preceding figures.

Various changes may be made in the details of construction of the guide and guard disclosed herein without departing from the spirit of the invention or sacrificing any of the advantages thereof.

I claim:

1. A guide and guard for self-administering drops to one's eyes comprising a member, means for supporting said member from a portion of the face, and means carried by said member for supporting an eye dropper with the discharge end thereof over the eye ball when said member is supported on said portion of the face with the head held back.

2. A guide and guard for self-administering drops to one's eyes as defined in claim 1 in which the means for supporting said member from a portion of the face is a saddle or bridge portion adapted to be supported on the bridge of the person's nose.

3. A guide and guard for self-administering drops to one's eyes as defined in claim 2 in which said member has a handle at the side remote from said saddle or bridge portion for holding the guide and guard on the bridge of a person's nose.

4. A guide and guard for self-administering drops to one's eyes comprising a saddle or bridge adapted to be supported from the bridge of a person's nose, a portion extending from said saddle or bridge to be positioned over one's eye, said portion having an opening therethrough for receiving and supporting an eye dropper, and a handle at the side of said portion remote from the saddle or bridge, whereby the guide and guard may be held supported on the bridge of one's nose with said portion above the eye.

5. A guide and guard for self-administering drops to one's eyes comprising a saddle or bridge adapted to be supported from the bridge of a person's nose, a portion extending from said saddle or bridge to be positioned over one's eye, a frusto-conical tube carried by said portion for receiving and supporting an eye dropper, and a handle at the side of said portion remote from the saddle or bridge, whereby the guide and guard may be held supported on the bridge of one's nose with said portion above the eye.

References Cited in the file of this patent

UNITED STATES PATENTS

| Number | Name | Date |
| --- | --- | --- |
| 1,006,945 | Houston | Oct. 24, 1911 |